(12) United States Patent
Ikejiri et al.

(10) Patent No.: US 8,177,642 B2
(45) Date of Patent: May 15, 2012

(54) GAME CONTROL PROGRAM, GAME CONTROL METHOD, AND GAME DEVICE

(75) Inventors: Daisaku Ikejiri, Tokyo (JP); Masashi Muramori, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 296 days.

(21) Appl. No.: 12/375,339

(22) PCT Filed: Apr. 10, 2007

(86) PCT No.: PCT/JP2007/000384
§ 371 (c)(1),
(2), (4) Date: Aug. 25, 2009

(87) PCT Pub. No.: WO2008/012936
PCT Pub. Date: Jan. 31, 2008

(65) Prior Publication Data
US 2009/0305787 A1 Dec. 10, 2009

(30) Foreign Application Priority Data
Jul. 28, 2006 (JP) .................................. 2006-207236

(51) Int. Cl.
*G06F 17/00* (2006.01)
(52) U.S. Cl. ........................................................ 463/38
(58) Field of Classification Search .............. 463/16–25, 463/33, 35, 37–39
See application file for complete search history.

(56) References Cited

U.S. PATENT DOCUMENTS

| 7,931,535 | B2* | 4/2011 | Ikeda et al. ...................... 463/38 |
| 7,942,745 | B2* | 5/2011 | Ikeda et al. ...................... 463/38 |
| 2003/0218537 | A1* | 11/2003 | Hoch et al. ...................... 340/524 |

FOREIGN PATENT DOCUMENTS

| JP | 10-249064 | 9/1998 |
| JP | 11-000469 | 1/1999 |
| JP | 2000-157719 | 6/2000 |
| JP | 2003-47766 | 2/2003 |
| JP | 2003-190632 | 7/2003 |

(Continued)

OTHER PUBLICATIONS

International Search Report dated Jun. 19, 2007, from the corresponding International Application.

(Continued)

*Primary Examiner* — Ronald Laneau
(74) *Attorney, Agent, or Firm* — Katten Muchin Rosenman LLP

(57) ABSTRACT

A highly amusing game apparatus is achieved. A game apparatus controls a game where a character operated by a user and an opponent character play ball to compete against each other by hitting a ball. When the user instructs the hitting of the ball by pressing a button of a controller, a hit control unit determines the timing at which the ball is hit by the character and the type of shot according to which button has been pressed by the user. When a parameter indicating the timing of hitting the ball, height of the ball, balance of the character, position of the character and distance between the character and the ball, or athletic ability of the character lies outside a predetermined range in which normal hitting is performable, the hit control unit changes the type of shot from the determined type of shot to another type of shot favorable to the opponent character.

12 Claims, 8 Drawing Sheets

FOREIGN PATENT DOCUMENTS

JP  2003-205173  7/2003

OTHER PUBLICATIONS

International Preliminary Report on Patentability and Written Opinion of the International Searching Authority dated Feb. 3, 2009, from the corresponding International Application.

"Love Smash! Super Tennis Players", Dengeki Playstation, vol. 7, No. 25, Sep. 28, 2001, p. 210.

Shigeru Nakamichi, et al. "V Jump Books [Game Series] Playstation 2nd edition Tennis no Ojisama Saikyo Team O Kessei seyo!", Sep. 21, 2004, p. 15.

"Final Fantasy XI Zilart no Gen'ei Promathia no Jubaku Atorugan no Hiho for Windows Playing Manual 2006", Apr. 27, 2006, p. 55.

Japanese Notification of Reasons(s) for Refusal dated Jun. 21, 2011 from corresponding Japanese Application No. 2006-207236.

"Final Fantasy XI, Rise of the Zilart, Chains of Promathia, Treasures of AHT Urhgan", for windows, playing manual, 2006 Square Enix Co., Ltd., received by JPO on Apr. 27, 2006, pp. 47-48 and 54.55.

Notification of Reason(s) for Refusal dated Jan. 24, 2012, from corresponding Japanese Application No. 2006-207236.

"Final Fantasy Crystal Chronicles", Dengeki Game Cube, Media Works, Sep. 1, 2003, vol. 3, No. 10, consecutive number of vol. No. 30, p. 6, 8-9, 20, 22.

Trick Expedition (Urawaza Tankentai) Dengeki GB Advance, Media Works, Oct. 1, 2001, vol. 1, No. 6, consecutive Number of vol. No. 6, p. 120-12.

* cited by examiner

US 8,177,642 B2

GAME CONTROL PROGRAM, GAME CONTROL METHOD, AND GAME DEVICE

TECHNICAL FIELD

The present invention relates to game control technologies, and in particular to a game control program, game control method, and game apparatus that control a game in which a user-controlled character and an opponent character hit a ball.

BACKGROUND ART

Many video ball games such as tennis, baseball, and soccer are currently on the market. In particular, the video games which allow the user to experience a simulated high-level competition, by controlling a character which simulates a real professional athlete, have become popular.

DISCLOSURE OF THE INVENTION

Problem To Be Solved By The Invention

However, seeking to achieve highly realistic matches using a character which simulates a popular professional athlete results in high-level competition beyond the level of a general amateur competition. Such highly realistic matches allow the user to enjoy a simulated high-level match but frequently require significant operational agility to win the match. Specifically, following the ball is often all that novices can do and they may have no time for controlling their characters by elaborating a strategy.

In view of such antithesis to the video game, the inventors made a technology for realizing a video game allowing more users to easily enjoy it and having elements that provide the intrinsic enjoyment of a ball game, such as strategy and game skill, as important factors.

The present invention has been made in view of the foregoing circumstances and an objective thereof is to provide a technology for realizing a highly amusing game.

Means to Solve the Problem

In order to resolve the above-described problems, a game control program according to one embodiment of the present invention is a program, for controlling a game where a character operated by a user and an opponent character play ball to compete against each other by hitting a ball, executed by a computer, and the program includes the functions of: upon receiving an operation input by the user, determining the timing at which the ball is hit by the character and the type of shot in accordance with a content of the operation input; changing the type of shot determined by the determining to a different type of shot when a parameter indicating the timing of hitting the ball, height of the ball, balance of the character, position of the character, distance between the character and the ball, or athletic ability of the character lies outside a predetermined range in which normal hitting is performable; and calculating the trajectory of the ball hit according to the type of shot and displaying a flying ball on a screen.

It should be appreciated that any combinations of the foregoing components, and any conversions of expressions of the present invention between methods, apparatuses, systems, and the like are also intended to constitute applicable embodiments of the present invention.

Advantage of the Present Invention

The present invention can provide a technology for realizing a more amusing game device

DESCRIPTION OF THE REFERENCE NUMERALS

10 Game apparatus, 20 Controller, 21 Direction keys, 22 Circle button, 23 Cross button, 24 Square button, 25 Triangle button, 26 Hit button, 30 Input unit, 40 Control unit, 41 Move control unit, 42 Hit control unit, 43 AI control unit, 44 Height display control unit, 45 Shot display control unit, 46 Serve control unit, 47 Power control unit, 48 Target display control unit, 49 Controller control unit, 60 Parameter storage unit, 62 Audio processing unit, 64 Speaker, 66 Image processing unit, 68 Display device.

BEST MODE FOR CARRYING OUT THE INVENTION

A game apparatus according to one embodiment achieves a video game in which a character controlled by a user and an opponent character operated by another user or a computer play a ball game in which they hit a ball, such as tennis, table tennis, badminton, or volleyball. Tennis is given here as an example by which the embodiment is described.

In the field of sports video games, the major games allow the user to enjoy a simulated high-level competition using a character simulating a real professional or famous athlete. Many tennis games also require significant operational agility to win because of quick ball movement. In such tennis games, following the ball is often all that novices can do and they may have no time for strategy such as, for example, selecting the proper shot type and ball speed or aiming at a target on the court depending on the situation. In this way, video games simulating professional competitions and the like have a high difficulty level, and thus have the problem of being hard for the user to play. Also, since some shift of the position of a character or the timing of stroke is forcibly corrected to allow the user to hit the ball with simple stroke operation, the user has a little sense of self-operation.

By contrast, the tennis game according to the present embodiment provides a tennis game which simulates a novice or amateur match by slowing down the movement of the ball to allow the user who is not good at responding quickly to enjoy it. The slow ball allows the user to plan operations such as the shot type and the timing of stroke for each ball approach, thereby providing a highly strategic game. Further, the tennis game according to the present embodiment does not simply decrease the difficulty level of the game. The ball is slow but is not returned in the target direction unless the ball is hit at the proper position and with the proper timing. In this way, a video game is provided which breaks away from the conventional view of video games of competition on the reflex nerve, and which can provide an intrinsically more interesting game of tennis with competition on the basis of game skill such as the direction chosen for returning the ball and the quality of the shot.

Figure 1:
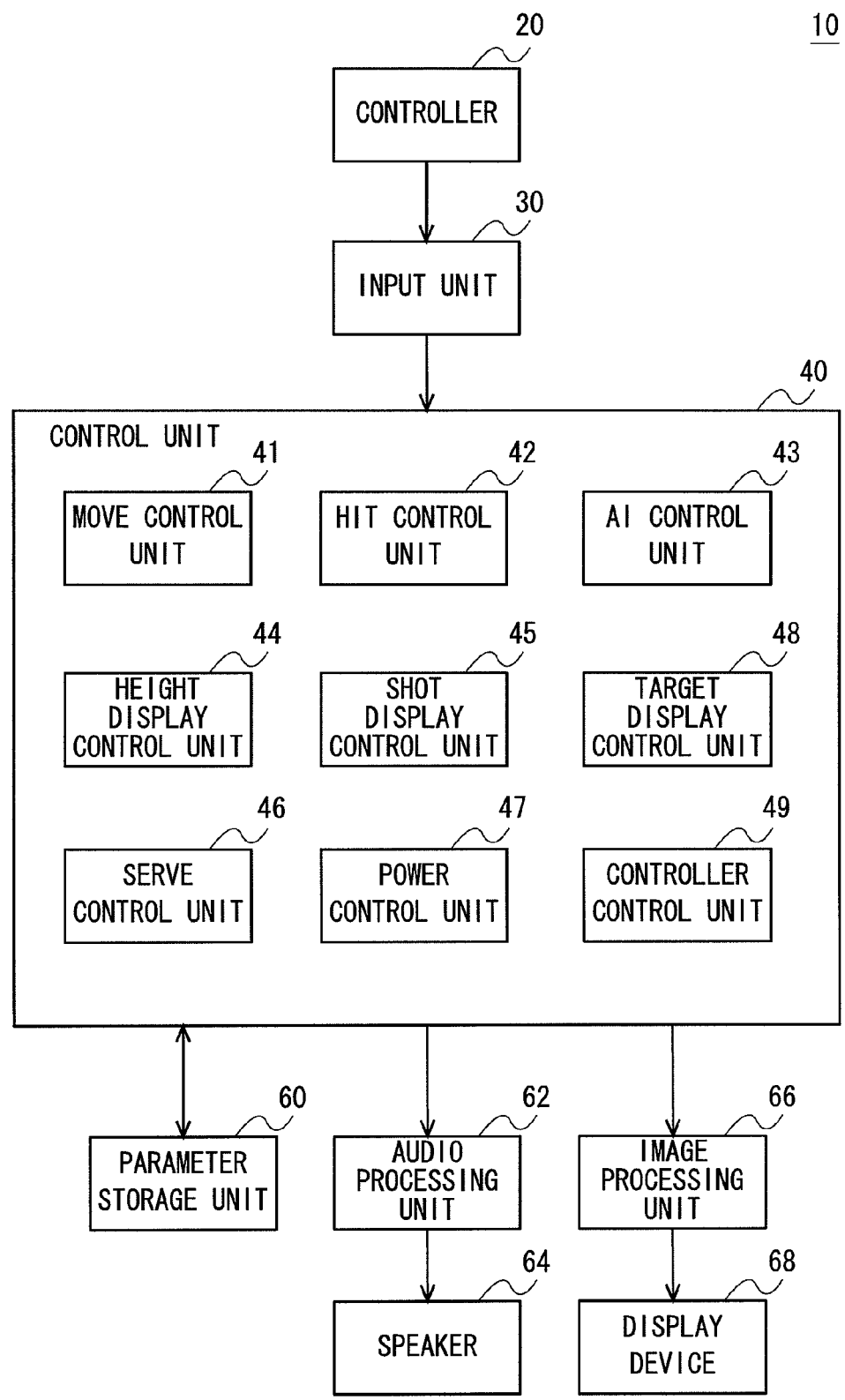
FIG. 1 is a diagram showing a configuration of a game apparatus according to an embodiment.

FIG. 1 shows a configuration of a game apparatus 10 according to the embodiment.

The game apparatus 10 includes a controller 20, an input unit 30, a control unit 40, a parameter storage unit 60, an image processing unit 66, and a display device 68. These components can be provided as hardware such as a CPU, a memory, and a program loaded in the memory of a computer, but the functional blocks that are realized by the cooperation between hardware components are shown herein. Accordingly, those skilled in the art will recognize that these functional blocks can be implemented in various configurations with hardware only, software only, or combinations of hardware and software.

The input unit 30 receives a control signal input through the controller 20, which is operated by the user. The control unit 40 executes game programs following user's instructions received by the input unit 30, and performs the tennis game while controlling the action of the character which serves as a tennis player in the game world. The parameter storage unit 60 stores parameters for determining athletic abilities, including movement speed, physical strength, power, stamina, degree of fatigue, controllability, spin, variations in shot (accuracy), ball power, and ball speed, as well as the name, type, and level of the character. The image processing unit 66 creates a game screen which is controlled by the control unit 40 and displays it on the display device 68.

Figure 2:
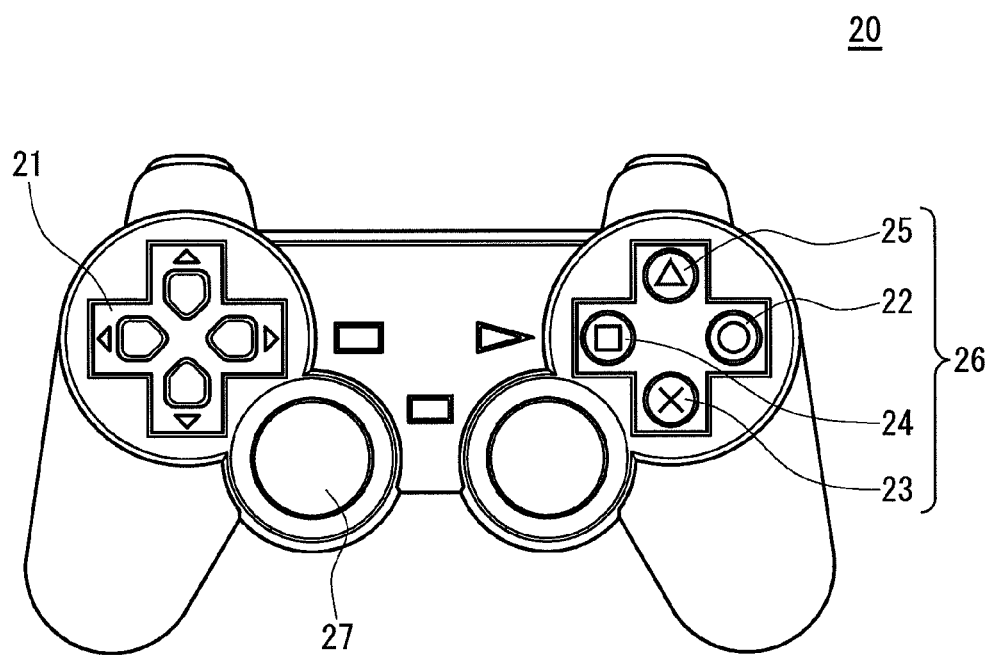
FIG. 2 shows an appearance of a controller.

FIG. 2 shows an appearance of the controller. The controller 20 is provided with direction keys 21, analog sticks 27, and four buttons 22, 23, 24 and 25. The four buttons 22 to 25 are marked with predetermined colors and predetermined figures to distinguish them from each other. Specifically, the circle button 22 is marked with a red circle, the cross button 23 is marked with a blue cross, the square button 24 is marked with a purple square, and the triangle button 25 is marked with a green triangle. In the video game according to the embodiment, the direction keys 21 or analog sticks 21 are mainly used to give instructions for the direction of movement of the character and the shot direction, and the four buttons 22 to 25 are used to hit the ball with a racket. The four buttons 22 to 25 are hereinafter collectively referred to as a "hit button 26".

Returning to FIG. 1, the explanation of each component will be continued.

The parameter storage unit 60 stores in advance parameters for controlling the action for multiple characters. When the type of the character to be controlled by the user and the type of the opponent character are selected at the start of the game, the control unit 40 reads out the parameters for the selected characters from the parameter storage unit 60.

Parameters emphasizing the personality of each character may be set. For example, characters for novices and characters for the experienced may be prepared. In this case, the characters for novices may be set in such a manner that a shift in the position and timing of hitting the ball shifts the direction of flight only a little off the targeted landing point but the physical strength and athletic ability of the character are low. On the other hand, characters for experienced players may be set in such a manner that the physical strength and athletic ability are high but a shift in the position and timing of hitting the ball shifts the direction of flight a large distance off the targeted landing point, and thus highly accurate positioning and timing of the shot is required.

The move control unit 41 controls the movement of the character. When the user gives instructions for the direction of movement of the character with the direction keys 21 or analog sticks 27, the move control unit 41 moves the character in the direction specified by the user. The move control unit 41 moves the character away from the user on the screen when the user presses the up key, moves the character toward the user on the screen when the user presses the down key, moves the character to the right on the screen when the user presses the right key, and moves the character to the left on the screen when the user presses the left key. The same is true for the analog sticks 27. When the user operates the direction keys 21 or analog sticks 27 while pressing a hit button 26 which is any one of the circle button 22, cross button 23, square button 24, and triangle button 25, the direction of flight of the ball (or the target point toward which the ball is directed) is identified as being specified and thus the character is not moved.

The move control unit 41 calculates the movement speed of the character on the basis of parameters indicating the athletic ability of the character, and calculates a moving distance of the character depending on the input time of the direction keys 21 or analog sticks 27. The move control unit 41 may calculate the degree of fatigue felt by the character on the basis of parameters indicating the physical strength of the character, and may decrease the movement speed of the character when the character is tired. For example, the game may be controlled so that continuous movement for a long time during a long rally causes the degree of fatigue felt by the character to become high and causes the character's movement speed to become low. High degree of fatigue may have an effect such that the allowable range of the racket is decreased, the power of the ball is decreased, and the variations in the direction of actual flight relative to the target point are increased. As a result, an undesirably slow game pace resulting from excessively long rallies can be prevented. Since the character can take a rest to recover his/her physical strength before the next play is started after the rally, the degree of fatigue may be reset.

The hit control unit 42 controls the stroke with which the ball is hit by the character and controls the behavior of the hit ball. When the user presses one of the circle button 22, cross button 23, square button 24, and triangle button 25 to give a hit instruction, the hit control unit 42 causes the character to act as if hitting the ball with the racket. At this time, the hit control unit 42 determines whether the stroke is successful, in other words, whether the racket hits the ball. The hit control unit 42 determines whether the racket hits the ball on the basis of the position and height of the ball when the hit button 26 is pressed, and the position of the character. Parameters indicating the possible range of the racket of the character may be referred to.

When the racket hits the ball, the direction of the ball, shot, ball speed, and ball power are each determined and the behavior of the ball is controlled accordingly. The hit control unit 42 first determines the type of shot by acquiring which button is pressed by the user. When the button which has been pressed by the user is the circle button 22, the shot is determined to be a top spin, when the button is the cross button 23, the shot is a slice, when the button is the square button 24, the shot is flat, and when the button is the triangle button 25, the shot is a lob. The targeted landing point on the opponent's court is substantially at the center of the opponent's court as a default. When the user presses the direction keys 21 or analog sticks 27 while pressing the hit button 26, the hit control unit 42 acquires the direction corresponding to the pressed button and moves the targeted landing point in that direction.

With the direction keys 21, the court is divided into nine sections: three rows by three columns, and the target is moved into one of the sections according to the pressed direction key 21. In other words, the user can select a hit direction from eight directions with respect to the center of the court which is the default target. With the serve described later, the service area is divided into nine sections where the center of the service area is the default target, and thus the user can select a hit direction from eight directions with respect to the center of the service area. With the analog sticks 27, since the target is moved in the direction of incline of the analog sticks 27, the user can select any hit direction from 360-degree directions with respect to the center of the court. A normal shot can be aimed to hit not less than 1 meter inside the lines. However, when the timing of the stroke is correct or when power of at least a predetermined level described later is accumulated, the normal shot can be aimed at a position closer to the line or the net.

The movement of the target may be limited according to the parameters of the character. For example, a parameter which indicates control performance over the stroke may be preset and an allowable range of angles at which the ball can be hit to the right and left may be set depending on this parameter. In this case, the angle of the stroke is calculated from the position of the character and the position of the target specified by the direction keys 21 or analog sticks 27, and if the angle is outside the allowable range of angles, the angle may be adjusted to be within the allowable range by shifting the position of the target.

The allowable range of angles may be changed depending on the ball power, ball speed, the type of shot used in the opponent's stroke, and the type of shot used in the user's stroke. For example, if the ball power of the opponent's stroke is high, the allowable range of angles may be narrowed, and if the ball power of the opponent's stroke is low, the allowable range of angles may be broadened. This can provide the same effects as in real tennis, such as striking the ball differently depending on the ball power of the opponent's stroke. If a flat shot is selected as the type of shot used in the user's stroke, the allowable range of angles may be narrowed. If the opponent delivers a slice shot, the allowable range of angles may be narrowed. In this case, a slice shot may be strategically utilized as a defensive shot to prevent an angle shot by the opponent.

The hit control unit 42 determines the speed and power of the ball on the basis of the timing of hitting, height of the ball at hitting, position of the character, parameter which indicates the athletic ability of the character, the relationship between shots which indicates a proper return shot with respect to the opponent's shot, and the like, and shifts the actual landing point of the ball from the target accordingly. For example, when the pressing operation of the hit button 26 by the user is late with the character holding the racket in his/her right hand, the landing point is shifted to the right of the target because the face of the racket when the character hits the ball faces to the right of the user's target. Conversely, when the pressing operation is early, the landing point is shifted to the left of the target because the face of the racket faces to the left of the user's target when it hits the ball. Moreover, when the ball is hit in a high position, the landing point is shifted to a position long of the target because the stroke is longer than expected. Conversely, when the ball is hit in a low position, the landing point is shifted to a position short of the target. The amount of shift is determined on the basis of the parameters of the character, the degree of fatigue, a parameter described later which indicates power, and the like. For example, the amount of shift may be set to be larger when the character hits the ball while moving. Moreover, the amount of shift may be set to be larger when, for example, the ball power of the opponent's stroke is high, when the type of shot chosen for the user's stroke is improper with respect to the shot used by the opponent, when the opponent's stroke strongly spins the ball, or when the degree of fatigue felt by the character is high. When the timing of stroke is early or late, the height of the ball at the time of stroke is low or high, or the position of the character at the time of the stroke is close to or far from the ball, the hit control unit 42 may reduce the ball speed or ball power as compared with the ability that the character has in the first place. When, on the contrary, the timing and the like are appropriate, it may allow the character to return the ball at a ball speed faster or with the ball power stronger than that achievable by the ability that the character has in the first place.

Suppose that parameters indicating the timing of hitting the ball, height of the ball at the instant it is hit, balance of a character, position of the character, distance between the character and the ball, or athletic ability of the character, a combination of the types of shot as to which type of shot is to be used in hitting the ball back against the type of shot the opponent has used in hitting the ball, and the like are outside a range where the ball can be returned normally. Then the hit control unit 42 returns the shot using the type of shot different from the type of shot determined by the hit button 26 entered by the user. For example, suppose that the timing of hitting the ball is later or earlier than a predetermined range of timings or the distance between the character and the ball is farther than a range where the ball can be returned normally. That is, in a situation, for example, where the ball must be returned under an adverse condition, the ball is returned as a missed shot, with the type of shot, such as a lob, which is favorable to the opponent. In other words, the erroneous operation by the user is reflected, thus making it impossible to return the ball with the intended type of shot. As a result, the entertainment quality of the gaming is improved.

The hit control unit 42 may automatically vary the type of shot according to the position aimed by the user, namely the direction inputted by the direction key 21 or the analog stick 27 when the ball is hit. In the above example, top spin is performed if the button inputted by the user is the circle button 22; slice is performed if it is the cross button 23; flat is performed if it is the square button 24; and lob is performed if it is the triangle button 25. For instance, both the top spin and the flat may be assigned to the circle button 22, so that flat may be performed when the shot is struck to aim at the opponent's base line side and top spin may be performed otherwise and so forth. In this manner, an appropriate type of shot may be determined automatically. As described above, multiple-types of shots may be assigned to a single button so that the hit control unit 42 can automatically select a type of shot from the multiple types of shots according to the position of a target specified by a user input from the direction key 21 or the analog stick 27. As a result, the multiple types of shots can be used as the situation demands. Hence, the user operation can be simplified and an interface easily operable by anyone can be achieved.

The hit control unit 42 shows the quality of timing on the screen when the user presses the hit button 26. For example, when the timing is too early, a rabbit symbol which indicates that the timing is advanced is shown close to the character, when the timing is too late, a tortoise symbol which indicates that the timing is retarded is shown, and when the timing is ideal, a note symbol is shown. The user can adjust the timing of his/her pressing operation by checking the symbol and thus improve his/her operational technique. The hit control unit 42 may change the sound of hitting according to the quality of timing.

The character for the beginner's class, which is set to allow a novice who has not mastered the timing of hitting to play may be so controlled as to allow a successful hit to be made even if the timing is incorrect. In this case, even if the user has pressed the hit button 26 too early without waiting for the ball, the hit control unit 42 does not start the hitting process immediately, but rather waits until the timing allows hitting, and then performs the hitting process when the ball comes within an allowable range for the hitting. Similarly, in this case, the hit control unit 42 displays a symbol to notify the user that the timing is too early because the ball is hit at the moment when it comes within the allowable range of hitting.

The hit control unit 42 calculates the trajectory of the ball on the basis of the determined shot, ball speed, ball power, and landing point, and displays it on the screen. The trajectory of the ball may be calculated with reference to the parameters of the character as well. For example, a parameter which indicates striking power is preset, and the initial speed of the ball may be determined on the basis of this parameter. Moreover, a parameter which indicates spinning performance is preset, and the degree of fall of the ball, the degree of swerving of the ball, rebound angle and the like may be determined on the basis of this parameter. Moreover, the degree of swerving of the spin ball and the like may be determined on the basis of the ball power. The hit control unit 42 may alter the path of the ball for each shot to exaggerate the feature of the shot. For example, the path of a slice ball may be curved more than a real one. As a result, it is possible to improve strategy for selecting the shot.

When the ball hit by the character lands out of the opponent's court, the control unit 40 increments the points scored by the opponent's character. When the opponent's character does not return the ball after the ball hit by the character lands in the opponent's court, the control unit 40 increments the point scored by the character which has hit the ball. In addition, the points are determined according to the rules of tennis competition.

The AI control unit 43 controls the behavior of any character not operated by the user. For example, if two users play a match in a singles competition, each character is controlled by one of the users' controllers 20, whereas if the user selects a match with the computer, the AI control unit 43 controls the opponent's character. The same is true for the doubles competition. When the user controls one of characters of the same team and the AI control unit 43 controls the other character, the character to be controlled may be switched by a predetermined button pressing operation. In this case, the move control unit 41 and hit control unit 42 control the behavior of the character which is under a user's control, and the AI control unit 43 controls the behavior of the character which is not under the user's control.

The height display control unit 44 controls the presentation of information that indicates the height of the ball on the screen to identify it. The height display control unit 44 displays the trajectory of the ball, and changes the display color of the trajectory depending on the height of the ball. The height display control unit 44 first presets the height of the ball which is a reference value for determining whether the ball is high or low. The reference value may be set as the height of the ball which allows the character to hit it most accurately on the basis of parameters such as the height or reach of the character, or may be set as a reference value in common among all characters. When displaying the trajectory of a flying ball, the height display control unit 44 displays the trajectory in red if the height of the ball is higher than the reference value, and displays the trajectory in blue if the height of the ball is lower than the reference value.

The height display control unit 44 may set a range of height of the ball which allows the character to hit the ball most accurately, display the trajectory in white if the height of the ball is within the range, display the trajectory in red if the height is higher than the range, and display the trajectory in blue if the height is lower than the range. A predetermined section of the trajectory, in vicinity of the ball only, may be displayed.

Figure 3:
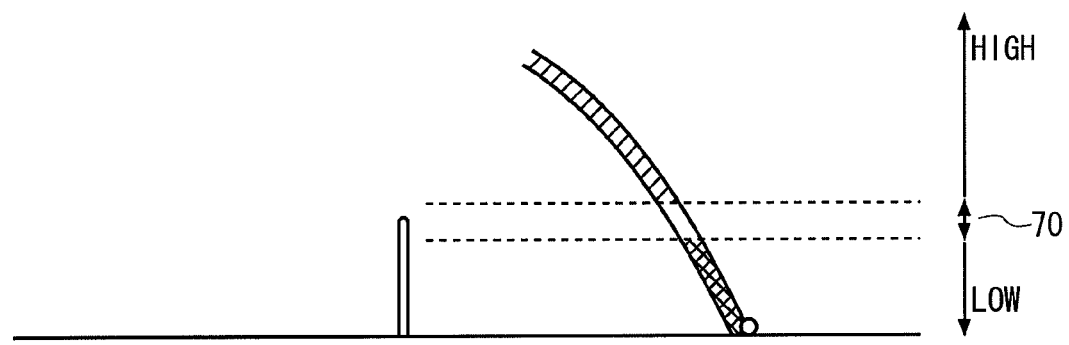
FIG. 3 shows a relationship between height of ball and color of its trajectory.

FIG. 3 shows the relationship between height of the ball and display color of the trajectory. FIG. 3 is a side view of a tennis court. A range 70 which allows the character to hit the ball accurately is set by the height display control unit 44. If the height of the ball is within the range 70, the trajectory is displayed in white, if the height of the ball is higher than the range 70, the trajectory is displayed in red (a diagonal line hatch from top right to bottom left in the drawing), and if the height of the ball is lower than the range 70, the trajectory is displayed in blue (a diagonal lattice hatch in the drawing).

As described above, if the height of the ball is within the range 70 when the character hits the ball, the hit control unit 42 sets the amount of shift in the depth direction of the landing point to zero. If the height of the ball is higher than the range 70 when the character hits the ball, the hit control unit 42 shifts the landing point to a position beyond the target. If the height of the ball is lower than the range 70 when the character hits the ball, the hit control unit 42 shifts the landing point to a position short of the target. If the height of the ball is out of the range which allows the character to hit when the hit button 26 is pressed, the hit control unit 42 identifies the stroke as a miss.

Figure 4:
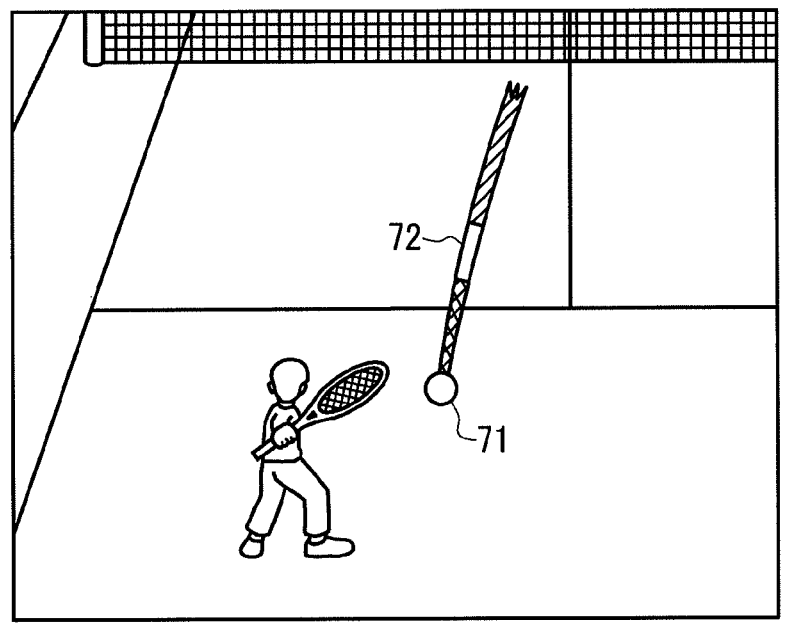
FIG. 4 is a screen view showing a trajectory displayed by a height display control unit.

FIG. 4 is a screen view showing a trajectory displayed by the height display control unit 44. The trajectory 72 is displayed behind a ball 71, and has a color which is dependent on the height of the ball. In FIG. 4, different hatches indicate different display colors. There are some conventional video ball games which indicate the height of the ball with the size of the shadow of the ball and the like. However, this type of indication makes it difficult to identify the height and makes the level of difficulty unnecessarily high for returning a lob. Representing the height by the color of the trajectory allows the user to easily determine the timing for hitting the ball even if the user has not mastered a technique for identifying the height of the ball by the shadow. This prevents the result of the match from depending on a technique not directly related to real tennis, i.e., identifying the height, and can provide a video game which focuses on the intrinsic strategy of tennis. The height display control unit 44 may change the sound of hitting according to the height of the ball when the character hits it.

The shot display control unit 45 controls the presentation of information on the screen which indicates the type of shot used in the stroke by the character so as to identify it. In real tennis, the type of shot is determined by visually noting the stroke form of the opponent and the ball bounce, but it is difficult to represent a subtle difference in the ball bounce on a two-dimension display screen. Accordingly, the shot display control unit 45 displays an effect that indicates the type of shot, near the hitting point or near the ball, when the character hits the ball or when the ball travels after being hit. For example, a figure with the same color and shape as that marked on the selected hit button 26 of the controller 20 is displayed.

Figure 5:
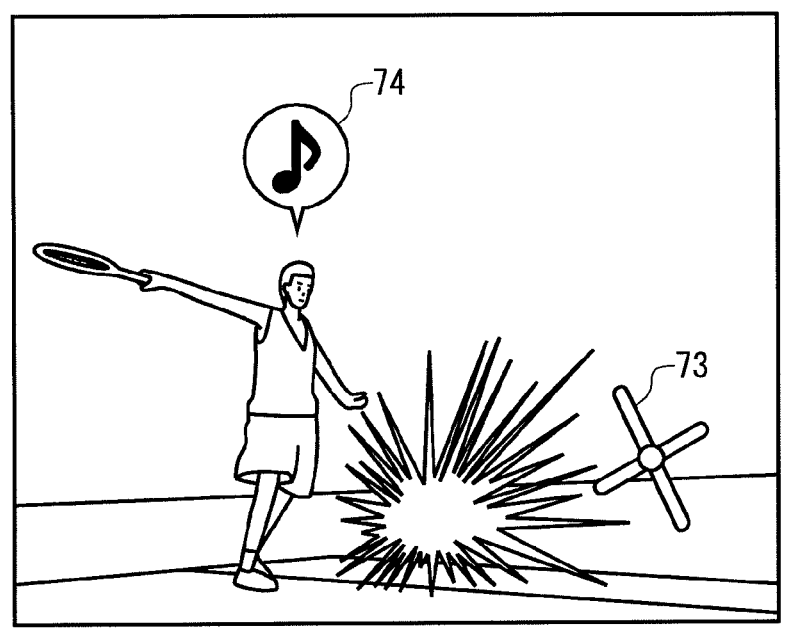
FIG. 5 is a screen view showing a shot type displayed by a shot display control unit.

FIG. 5 is a screen view showing the shot displayed by the shot display control unit 45. When the user makes a top spin shot with the circle button 22, a red circle is displayed near the ball; when the user makes a slice shot with the cross button 23, a blue cross is displayed near the ball; when the user makes a flat shot with the square button 24, a purple square is displayed near the ball; and when the user makes a lob shot with the triangle button 25, a green triangle is displayed near the ball. In this way, the shot display control unit 45 displays the type of shot used in the stroke by displaying information which can identify the button used for an operation of the user's hitting instruction, such as the figure or the letter which is marked on that button. In the example of FIG. 5, a blue cross 73 which indicates a slice shot is displayed near the ball. Thus, the user can determine the type of shot immediately after the opponent hits the ball, and move the character accordingly. Moreover, displaying this visually amusing and showy effect makes it possible to improve the amusement the video game provides. The shot display control unit 45 may change the sound of hitting according to the type of shot. For example, the quality of the timing of hitting may be represented by the pitch of a sound, and the type of shot may be represented by the length of a sound. The timing may be represented by a sound immediately after hitting, and the type of shot or the height of the ball may be represented by a sound when the ball travels. The shot display control unit 45 may vary the size of a figure to be displayed for indicating the type of shot, according to the power of the ball hit. For example, when a ball hit with high power is returned, a figure having the size larger than the normal size may be displayed. The sound of hitting may be set to a higher level. This enables the user to recognize the level of the power of the ball hit by the opponent. If, as described above, it is determined by the hit control unit 42 that the timing of the stroke and the like are outside the range where the ball can be returned normally, and the type of shot which is not the type of shot determined by the hit button but is favorable to the opponent is automatically selected, then an arrangement may be such that the shot display control unit 45 does not display the information on this shot as missed shot. Or, an arrangement may be such that the shot display control unit 45 displays the figure according to the type of shot automatically selected by the hit control unit 42. Note that FIG. 5 shows a symbol 74 which indicates the timing of hitting as well.

Figure 6:
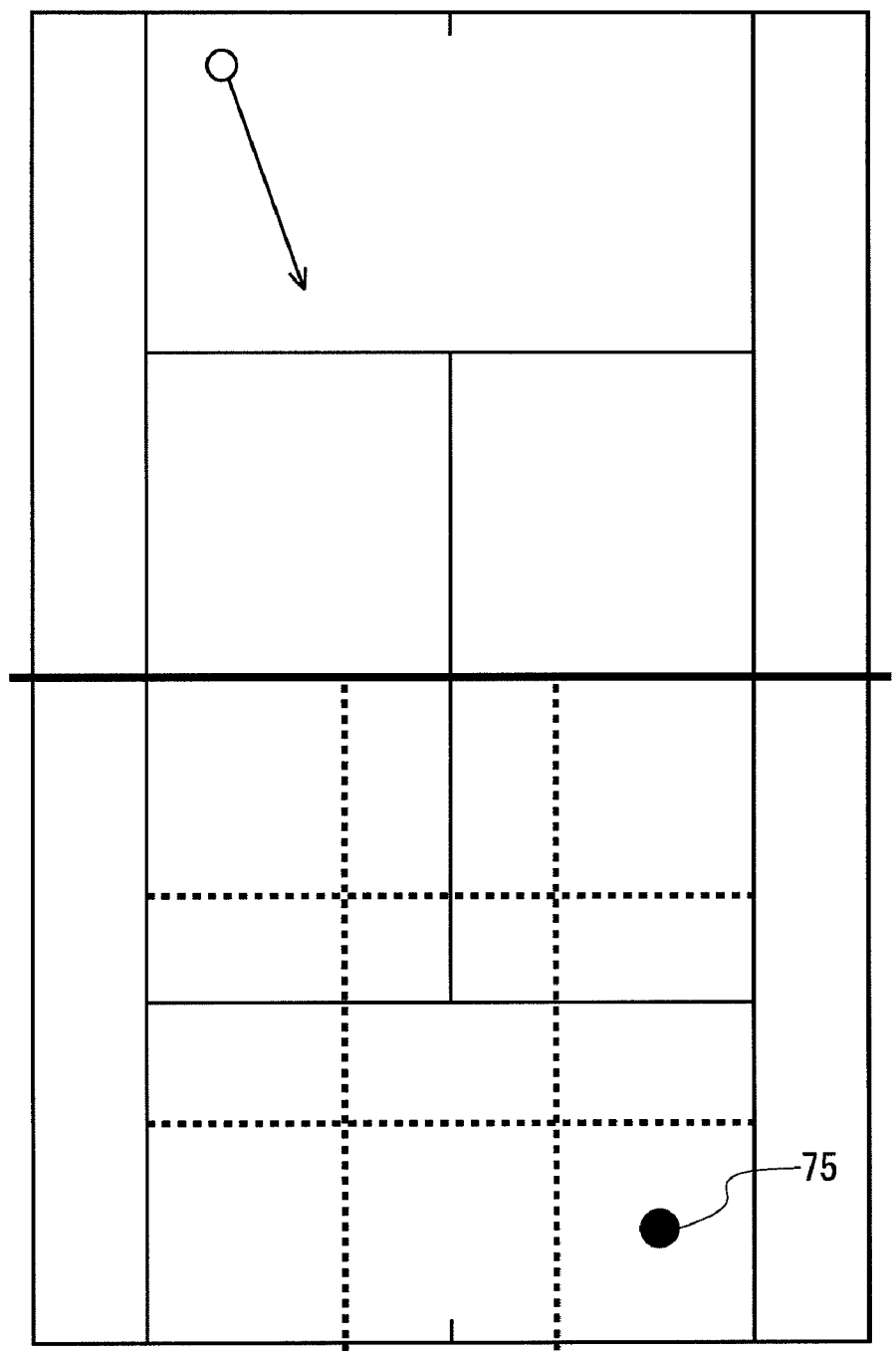
FIG. 6 shows how a figure indicating the position of a target is displayed by a target display control unit.

A target display unit 48 displays an effect that indicates the position of a target in order for the user to know beforehand the direction of the ball when it is hit by the character. FIG. 6 shows how the target display control unit 48 displays a figure indicating the position of a target. When a character on an upper position on the screen hits a ball and a target moves as a result of the user operation on the direction keys 21 or the analog sticks or an instruction from the AI control unit 43, the target control unit 48 divides the court into nine areas of 3 by 3 vertically and horizontally, as described above, and identifies an area lying in a position specified by the user operation or the instruction from the AI control unit 43 so as to display the position of the target at said area. For example, a figure 75 may be displayed on the central position of the area. If the target is not moved because no operation is performed by the user or no instruction is given by the AI control unit 34, the target will be set approximately in the center of the court. Thus, the target display control unit 48 specifies the area lying in the center of the court and displays the figure 75, indicating the position of the target, in the area. The position where the figure 75 is displayed may not be necessarily identical to the landing point of the ball. The figure 75 is displayed to show in which direction the target is moved and set, namely, to show in which direction the ball is aimed and hit. As described above, the actual landing point of the ball may deviate from the target depending on the timing at which the ball is hit and the like. When the opponent character hits the ball at the position displayed by the figure 75, the user can figure out an approximate direction of flight of the ball, which does not necessarily coincide with the landing point. Thus the user needs to move the character in accordance with the actual landing point to hit the ball. This adjusts the difficulty level of the game, thus improving the amusement of the games.

The serve control unit 46 controls the execution of serves. The serve control unit 46 makes the character controlled by the user perform a serve when the user presses the hit button 26 twice. When receiving the input of the right or left direction keys 21 before a serve, the serve control unit 46 moves the character to the right or left for the serve. When receiving the first input of the hit button 26, the serve control unit 46 makes the character perform the action of tossing a ball. When receiving the second input of the hit button 26, the serve control unit 46 makes the character perform the action of a serve.

The serve control unit 46 determines the power or speed of the ball in a serve according to the type of the hit button 26 pressed in the first pressing operation. For example, when the square button 24 is pressed, the power or speed of the ball is increased, and when the cross button 23 is pressed, the power or speed of the ball is decreased. When the triangle button 25 is pressed, an underhand serve is selected. When the circle button 22 is pressed, the power or speed of the ball is selected automatically. When the circle button 22 is pressed, the power or speed of the ball is increased for the first serve, and the power or speed of the ball is decreased for the second serve. If the power or speed of the ball is increased, the serve control unit 46 may increase the amount of shift from the landing point when the timing of hitting is shifted, thereby decreasing the accuracy of the serve. Conversely, if the power or speed of the ball is decreased, the serve control unit 46 may decrease the amount of shift, thereby increasing the accuracy of the serve. If a serve with high power is selected, it may allow the user to aim at a position closer to the line than a serve with low power.

The serve control unit 46 determines the type of shot used for the serve according to the type of hit button 26 pressed in the second pressing operation. The shot is a top spin when the circle button 22 is pressed, a slice when the cross button 23 is pressed, flat when the square button 24 is pressed, and a lob when the triangle button 25 is pressed, as when hitting during a rally. When one of the direction keys 21 is pressed in the second pressing operation of the hit button 26, the target of the landing point of the ball is moved in the direction corresponding to the pressed key. The control of the behavior of the hit ball is the same as that described above with regard to the hit control unit 42.

Figure 7:
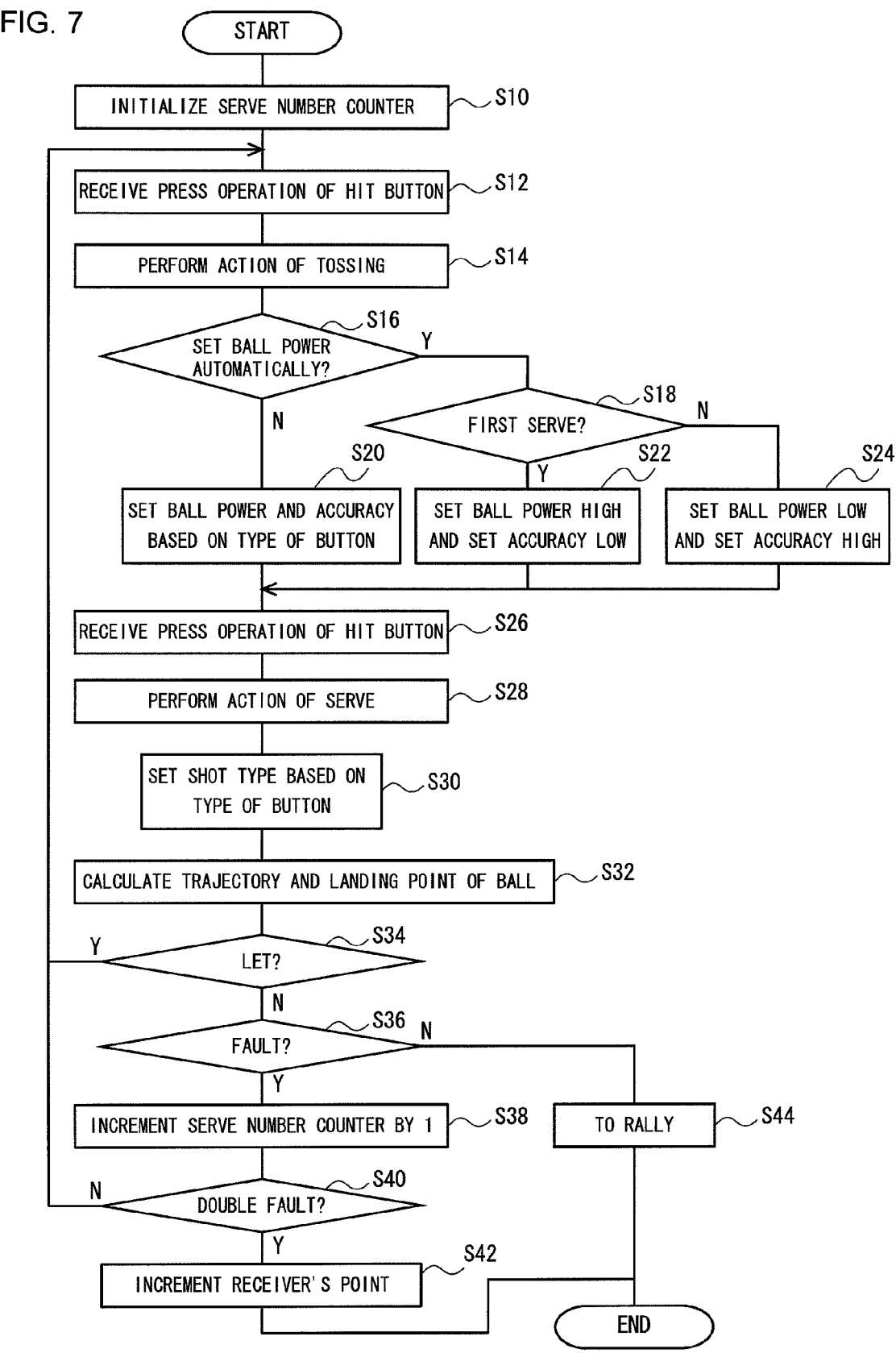
FIG. 7 is a flowchart showing a control procedure of a serve control unit.
Figure 8:
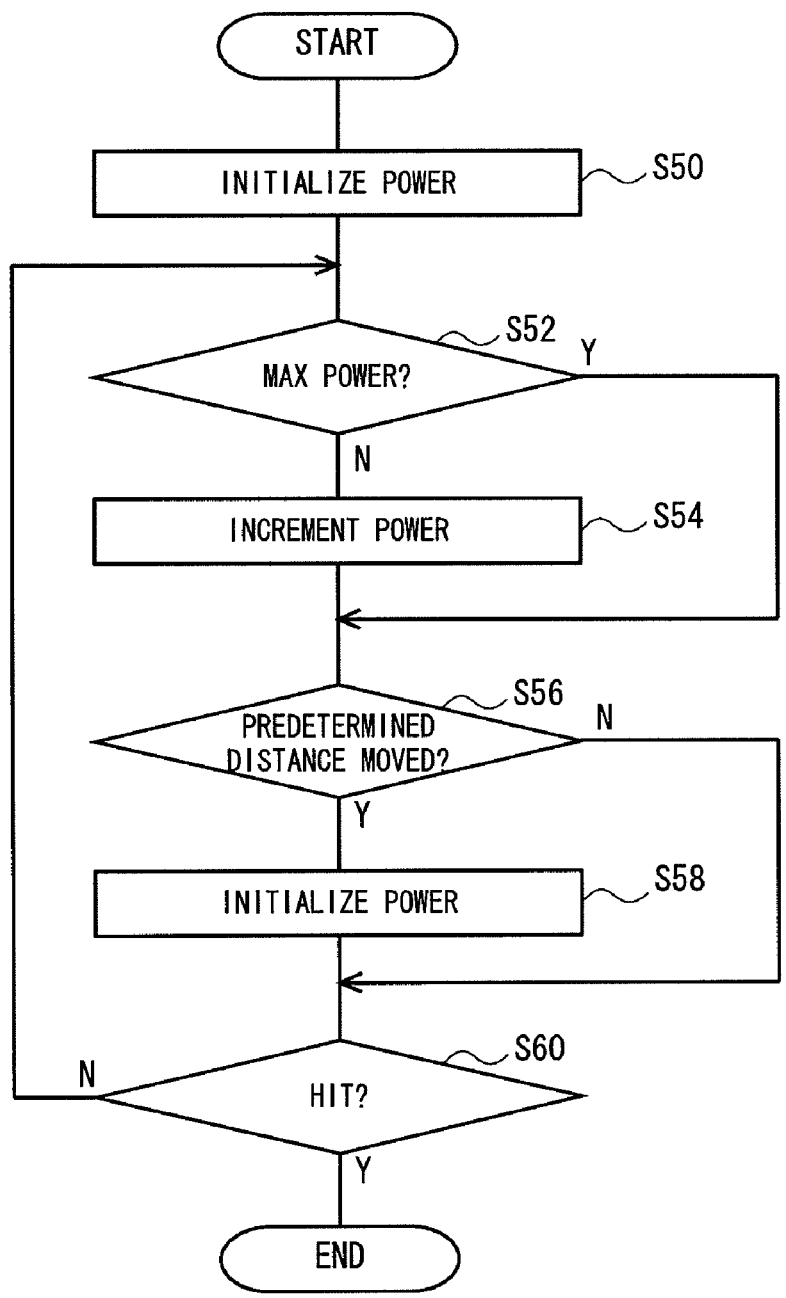
FIG. 8 is a flowchart showing a control procedure of a power control unit.

FIG. 7 is a flowchart showing a control procedure of the serve control unit 46. The serve control unit 46 initializes the counter, which shows the number of serves, to 1 before the character serves (S10). Then, the serve control unit 46 waits for a user's pressing operation of the hit button 26, and upon receiving the pressing operation of one of the hit buttons 26 (S12), makes the character perform the action of tossing a ball (S14). If the type of the hit button 26 which has been pressed by the user is other than the circle button 22 for automatically setting the ball power (N of S16), the power and accuracy of serve are set according to the type of the button (S20). If the circle button 22 is pressed (Y of S16), the serve number counter is referred to. If this is the first serve (Y of S18), the power is set high and the accuracy is set low (S22); or if it is the second serve (N of S18), the power is set low and the accuracy is set high (S24).

When the second pressing operation of the hit button 26 is received while tossing the ball (S26), the serve control unit 46 makes the character perform the action of a serve (S28). At this time, the type of shot used in the serve is set according to the type of the hit button 26 pressed by the user (S30). Here, the parameters of the power and the accuracy determined at S20, S22, or S24 may be adjusted on the basis of the timing of the second pressing operation of the hit button 26. In addition, the trajectory and landing point of the ball are calculated, and the success or failure of the serve is judged (S32). When the serve is a let (Y of S34), the procedure is returned to S12 for performing the first serve again. When the serve is not a let (N of S34) but a fault (Y of S36), the serve number counter is incremented by one (S38). If the first serve is a fault (N of S40), the procedure is returned to S12 for performing the second serve. When the serve is a double fault (Y of S40), the receiver's points are incremented and the serve is ended (S42). When the serve is neither a fault nor a let (N of S36), the hit control unit 42 controls processing for a rally (S44).

Thus, even on the first serve, it is possible to reduce the power of the shot and serve with focused accuracy; and conversely, even on the second serve, it is possible to serve with a high-powered shot at the expense of accuracy. This increases the degree of freedom in determining strategy and allows the user to further enjoy the game skill involved in the serves which form an important component of competition.

In the examples described above, the speed or power of the ball is determined by the first pressing operation, and the shot is determined by the second pressing operation. However, the opposite may be true or the serve may be performed by three or more press operations. Moreover, the ball speed, ball power, and the type of shot are determined on the basis of the type of the hit button 26 pressed, but the shot and the like may alternatively be determined on the basis of how the button is pressed or on a combination of multiple buttons.

The power control unit 47 increases the parameter which indicates the power of the character when the character is at rest, and controls the speed, power, or accuracy of the ball accordingly so that they are higher than usual when the character hits the ball with this parameter at or above a predetermined value. Moreover, in this circumstance, the user may be able to aim at a position close to the line at which the user cannot usually aim. When the character begins moving, the power control unit 47 may reset this parameter to zero. The power control unit 47 may maintain the parameter at the value which has been accumulated while the character remains within a predetermined distance, for example, within a range of 50 cm, even if the character begins moving. A level may be set according to the value of the parameter which indicates the power, and the speed, power and accuracy of the ball and the like may be determined on the basis of this level.

FIG. 7 is a flowchart showing the control procedure of the power control unit 47. The power control unit 47 initializes the power of the characters to zero after a serve (S50). After that, so long as the power does not reach the maximum value (N of S52), the power is incremented (S54). If the power reaches the maximum value (Y of S52), processing for incrementing the power is skipped so as not to increase the power any higher. The above processing is repeated until the character performs a hitting action (N of S60), so long as the character remains within a predetermined range (N of S56), thereby accumulating power. This loop processing is performed at predetermined time intervals. If the character moves by a predetermined distance or more (Y of S56), the power is initialized (Y of S58). If the character hits the ball (Y of S60), the power accumulated at that time is reflected in the setting of parameters such as the speed, power, and accuracy of the ball.

In this way, the system is configured so that if the user performs a hitting operation after the user estimates the opponent's shot, quickly moves the character to a position suitable for returning the ball, and recovers the character's balance at that position, then the speed, power, accuracy and the like of the ball are improved. This can provide the same effects as in real tennis. Moreover, when the ball falls outside the estimated position, the user can select a stroke without high power after moving the character to the proper position, or a stroke with high power and with some shift from the proper position, and thereby a new choice in strategy is created. As a result, the video game allows the user to enjoy more intrinsically interesting tennis incorporating strategy and game skill.

In the examples described above, the parameter indicating the power is increased depending on the time period during which the character is at rest. However, the parameter may be increased depending on the time period when the user presses a predetermined button. For example, the parameter is increased while the user presses the hit button 26, and the hitting is performed on the basis of the parameter value at the time when the hit button 26 is released.

An audio processing unit 62 produces the sound of hitting the ball by the user, the sound of the ball flying, other sound effects and the like and has them outputted from a speaker 64. The audio processing unit 62 calculates a two-dimensional or three-dimensional sound field based on the sound generated from a sound source, sets a microphone in predetermined positions and calculates the sound audible in those positions. The audio processing unit 62 amplifies the sense of reality with the sound effects. To achieve more effective sound effects, the audio processing unit 62 varies the set position of the microphone in accordance with the set position of a camera in the image processing unit 66. For example, when the sound of a ball traveling from left to right is expressed, the travel distance of sound differs in between a case where the microphone is placed 10 meters away from the trajectory of the ball and a case where the microphone is placed 1 meter away from it. Accordingly, when the position of the camera is moved closer to the court, the position of the microphone is also moved closer to the court, so that the sense of reality can be further raised. In this manner, setting variably the position of the microphone enables effectively controlling the dynamical movement of the sound.

Figure 9:
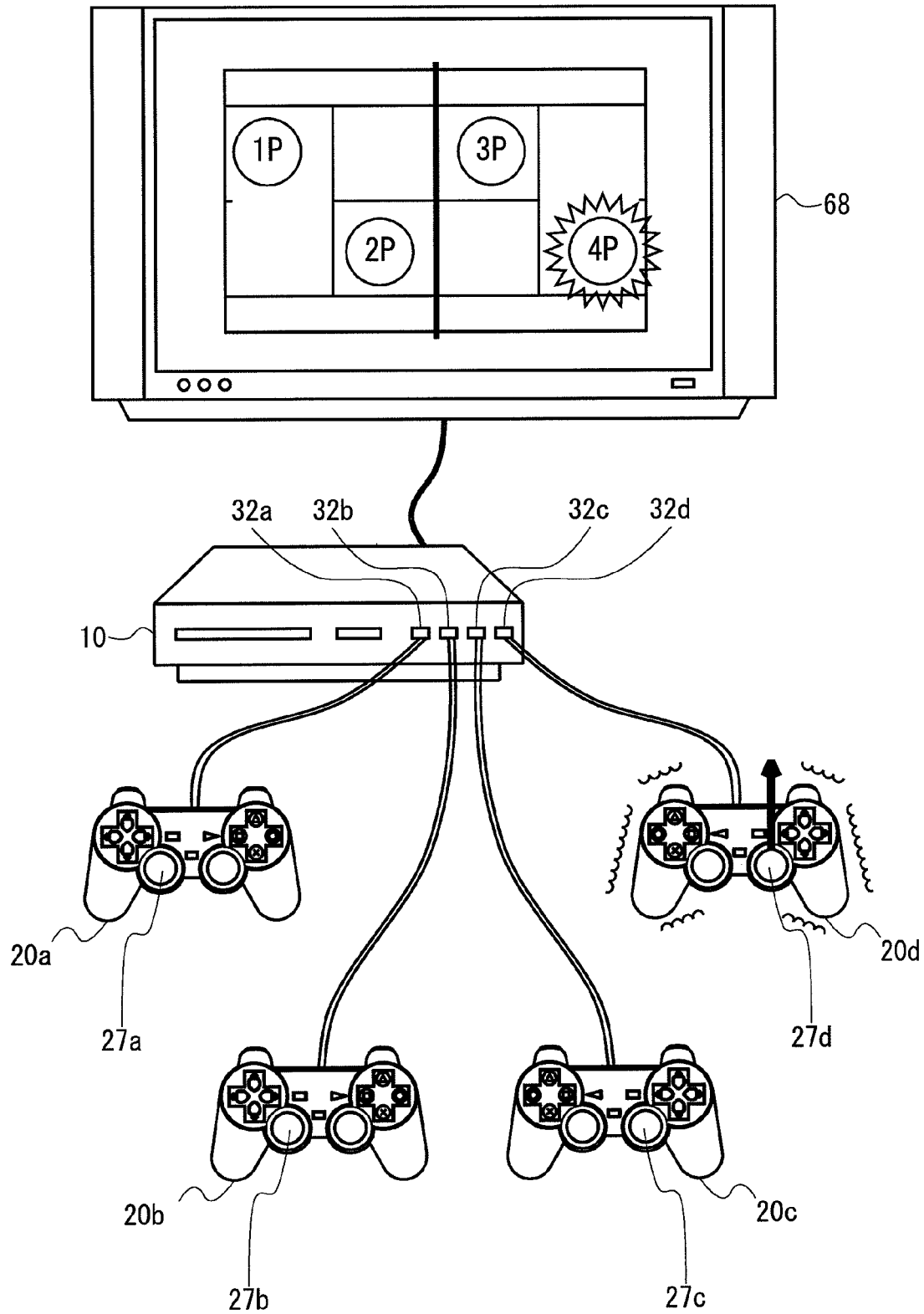
FIG. 9 shows how a plurality of controllers are connected to a game apparatus.

The controller control unit 49 performs such a control as to be able to easily identify an object to be operated by the user himself/herself through the controller 20 when a game is played using a plurality of controllers. FIG. 9 shows how a plurality of controllers 20a, 20b, 20c and 20d are connected to a game apparatus 10. The controllers 20a, 20b, 20c and 20d are connected respectively to a plurality of ports 32a, 32b, 32c and 32d with which to connect to a controller provided in the main body of the game apparatus 10. For the control unit 40 that receives operation inputs from the plurality of controllers 20a to 20d and controls a doubles game of tennis, a player 1P is an object to be operated by the controller 20a connected to the port 32a, whereas players 2P, 3P and 4P are objects to be operated by the controller 20b, 20c and 20d, respectively.

When starting a match game, the control unit 40 displays a screen as shown in FIG. 9 and receives instructions on a combination of the players. At this time, the user has to check on which player or players is/are an object or objects to be operated by the controller owned by the user himself/herself. Confirming which port the controller of the user himself/herself has connected to can verify if an object or objects to be operated by his/her own controller is/are the player 1P, 2P, 3P, or 4P but it is inconvenient to check this by tracking on cables. Thus, when the controller control unit 49 receives an operation input requesting an identification of the object to be operated by the controller, the controller control unit 49 displays the object to be operated by the controller on the screen of the display unit 68 in an identifiable manner and allows the user to recognize the correspondence between the controller and the object to be operated, by vibrating the controller or has the controller emit light. For example, when the user of the controller 20d moves the analog stick 27d in an "up" direction, the controller control unit 49 receives its operation input and highlights the icon of the player 4P, which is the object to be operated by the controller 20d, in a display format different from that of the icons of the other players. At the same time, the controller control unit 49 sends a control signal to the controller 20d so as to vibrate the controller 20d. As a result, the user can easily recognize that the object to be operated by the controller 20d owned by the user himself/herself is the player 4.

Figure 10:
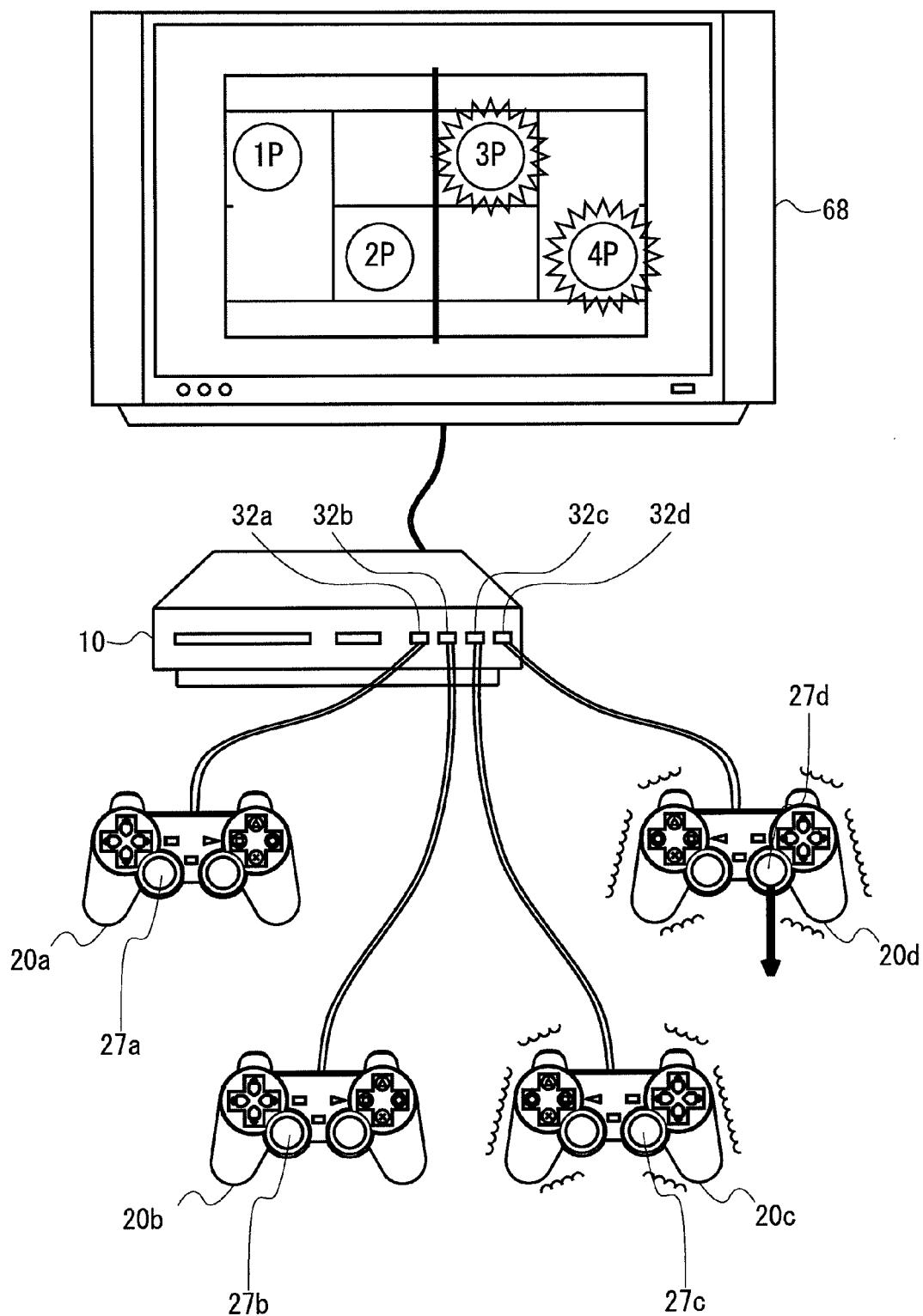
FIG. 10 shows how a plurality of controllers are connected to a game device.

FIG. 10 shows how a plurality of controllers 20a, 20b, 20c and 20d are connected to a game apparatus 10. In the example as shown in FIG. 10, when the user of the controller 20d moves the analog stick 27d in a "down" direction, the controller control unit 49 receives its operation input and, similarly to the example shown in FIG. 9, it first highlights the icon of the player 4P, which is the object to be operated by the controller 20d, in a display format different from that of the icons of the other players. Further, the controller control unit 49 highlights the icon of the fellow player 3P playing doubles with the player 4P in a display format different from that of the icons of the other players. At the same time, the controller control unit 49 sends a control signal to the controller 20c so as to vibrate the controller 20c. As a result, the user can recognize that the object to be operated by the controller 20d owned by the user himself/herself is the player 4 and can easily recognize a user who operates the player 3P scheduled to play as a doubles partner.

As described above, in the tennis game according to the present embodiment, rapid determination and quick operation are not important, and reducing the speed of the ball allows the user to take a longer time for deciding on a strategy on the basis of various types of information available. Moreover, clearly presenting information such as shot and ball height allows a video game which focuses on strategy such as returning the ball to a desired target and changing the type of shot.

Described above is an explanation on the basis of the embodiment. The embodiment is only illustrative in nature and it will be obvious to those skilled in the art that variations in constituting elements and processes are possible within the scope of the present invention.

INDUSTRIAL APPLICABILITY

According to the present invention, a technology for realizing a highly entertaining game is provided.

The invention claimed is:

1. A game apparatus, comprising:
a plurality of controllers;
a control unit which receives an instruction input from the plurality of controllers and executes a match game;
a controller control unit which, when a predetermined operation input is received from a first controller included in the plurality of controllers while a plurality of objects to be operated by the plurality of controllers are being displayed, displays an objected to be operated by a second controller operating an object to be operated belonging to a same team of an object to be operated by the first controller having received the predetermined operation input in a display format different from the objects to be operated by the controllers other than the first and second controllers.

2. The game apparatus according to claim 1, wherein the controller control unit sends a control signal to said first controller having received the predetermined operation input so as to vibrate the first controller or have the first controller emit light.

3. A game control program stored in a non-transitory computer-readable medium for a computer having a processor to receive an instruction input from a plurality of controllers and controlling a match game, the program comprising instructions for the computer to execute:
a module which, when a predetermined operation input is received from a first controller included in the plurality of controllers while a plurality of objects to be operated by the plurality of controllers are being displayed on a display screen, displays an object to be operated by a second controller operating an object to be operated belonging to a same team of an object to be operated by the first controller having received the predetermined operation input in a display format different from the objects to be operated by the controllers other than the first and second controllers.

4. The game apparatus according to claim 1, wherein the controller control unit sends a control signal to said second controller so as to vibrate the second controller or have the second controller emit light.

5. A game apparatus, comprising:
a plurality of controllers;
a control unit that receives an instruction input from the plurality of controllers and executes a match game;
a controller control unit that, when a predetermined operation input is received from a first controller included in the plurality of controllers while a plurality of objects to be operated by the plurality of controllers are being displayed, displays an object to be operated by the first controller having received the predetermined operation input in a display format different from the objects to be operated by the controllers other than the first controller.

6. The game control program according to claim 3, further including a module which sends a control signal to said first controller having received the predetermined operation input so as to vibrate the first controller or have the first controller emit light.

7. The game control program according to claim 3, further including a module that sends a control signal to said second controller so as to vibrate the second controller or have the second controller emit light.

8. A game control program stored in a non-transitory computer-readable medium for a computer having a processor to receive an instruction input from a plurality of controllers and controlling a match game, the program comprising instructions for the computer to execute a module which, when a predetermined operation input is received from a first controller included in the plurality of controllers while a plurality of objects to be operated by the plurality of controllers are being displayed on a display screen, displays an object to be operated by the first controller having received the predetermined operation input in a display format different from the objects to be operated by the controllers other than the first controller.

9. A game control method executed by a computer having a processor comprising:

receiving an instruction input at the computer from a plurality of controllers and controlling a match game;

displaying, on a display screen, when a predetermined operation input is received from a first controller included in the plurality of controllers while a plurality of objects to be operated by the plurality of controllers are being displayed, an object to be operated by a second controller operating an object to be operated belonging to a same team of an object to be operated by the first controller having received the predetermined operation input in a display format different from the objects to be operated by the controllers other than the first and second controllers.

10. The game control method according to claim 9, further comprising:

sending a control signal to said first controller having received the predetermined operation input so as to vibrate the first controller or have the first controller emit light.

11. The game control method according to claim 9, further comprising:

sending a control signal to said second controller so as to vibrate the second controller or have the second controller emit light.

12. A game control method executed by a computer having a processor comprising:

receiving an instruction at the computer input from a plurality of controllers and controlling a match game;

displaying on a display screen, when a predetermined operation input is received from a first controller included in the plurality of controllers while a plurality of objects to be operated by the plurality of controllers are being displayed, an object to be operated by the first controller having received the predetermined operation input in a display format different from the objects to be operated by the controllers other than the first controller.

* * * * *